(No Model.) 2 Sheets—Sheet 2.
R. ORTEGA.
LITTER.

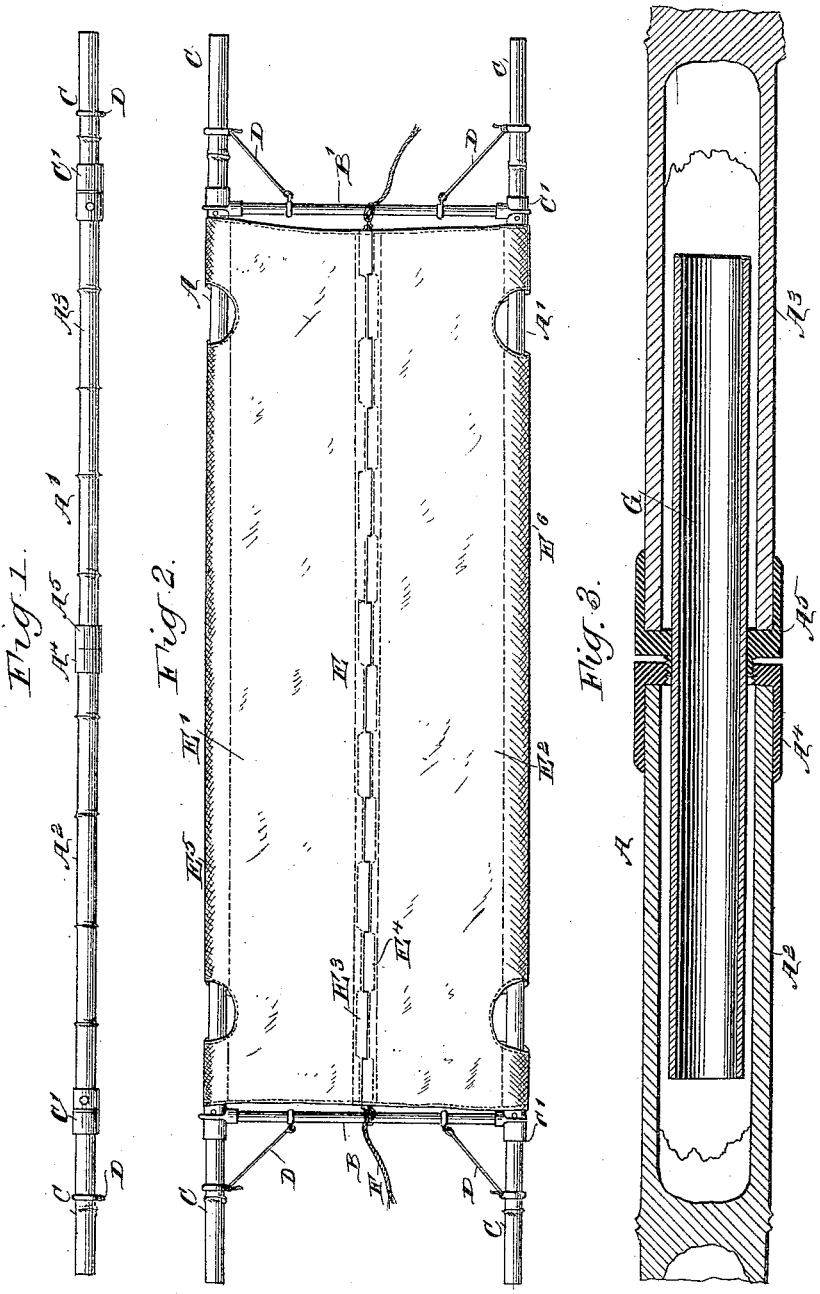

No. 529,301. Patented Nov. 13, 1894.

WITNESSES:
Paul Johol
Theo. G. Hoster

INVENTOR
R. Ortega
BY
Munn & Co.
ATTORNEYS.

UNITED STATES PATENT OFFICE.

RICARDO ORTEGA, OF CIUDAD PORFIRIO DIAZ, MEXICO.

LITTER.

SPECIFICATION forming part of Letters Patent No. 529,301, dated November 13, 1894.

Application filed July 3, 1894. Serial No. 516,446. (No model.)

*To all whom it may concern:*

Be it known that I, RICARDO ORTEGA, of Ciudad Porfirio Diaz, Coahuila, Republic of Mexico, have invented a new and Improved Litter, of which the following is a full, clear, and exact description.

The object of the invention is to provide a new and improved litter, which is comparatively simple and durable in construction, and arranged in such a manner that a patient can be conveniently carried to, and transported in an ambulance or train, then carried to the hospital and placed on the operating table and then in the bed, without once bodily lifting the patient, thus avoiding unnecessary pain and hemorrhages, or the complication of a simple fracture, &c.

The invention consists in certain parts and details, and combinations of the same, as will be hereinafter fully described and then pointed out in the claims.

Reference is to be had to the accompanying drawings, forming a part of this specification, in which similar letters of reference indicate corresponding parts in all the views.

Figure 4:
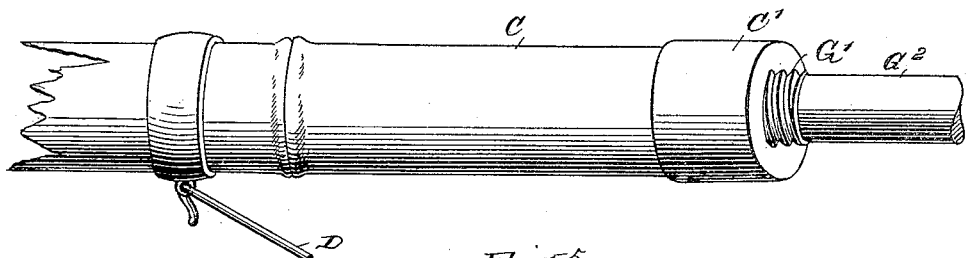
Figure 5:
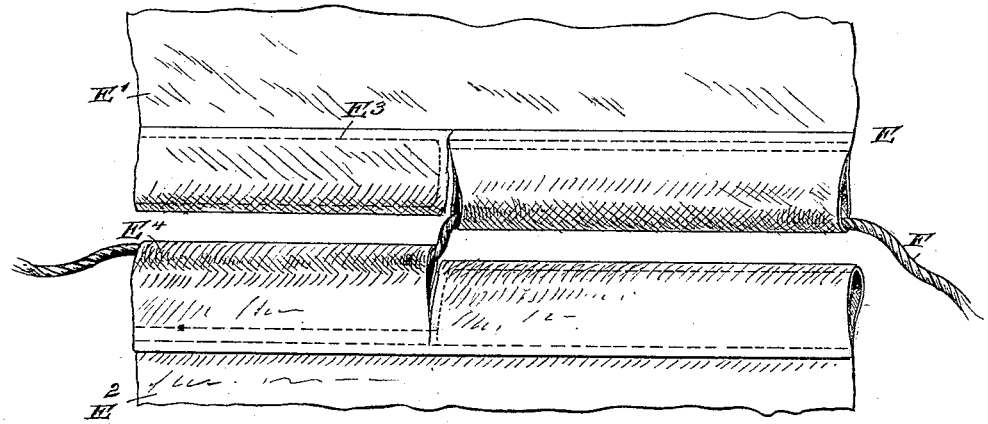
Figure 6:
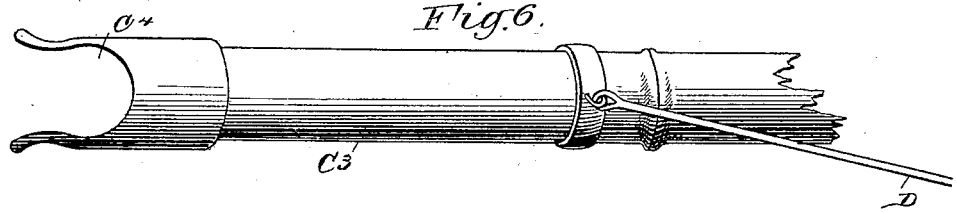
Figure 7:
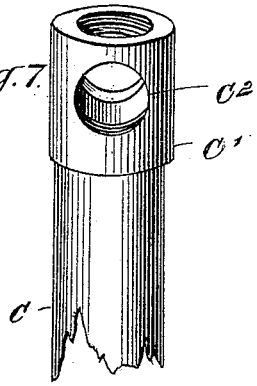

Figure 1 is a side elevation of the litter with the fabric removed. Fig. 2 is a plan view of the improvement. Fig. 3 is an enlarged sectional side elevation of the side bar joint. Fig. 4 is an enlarged perspective view of one of the handles. Fig. 5 is an enlarged plan view of part of the fabric. Fig. 6 is a perspective view of a modified form of handle; and Fig. 7 is a perspective view of part of a handle as used for a leg of the frame.

The improved litter or stretcher is provided with a frame having the side bars A and A' connected with each other at their ends by the cross bars B and B', and on the ends of the said side bars are secured removable handles C, adapted to be taken hold of by the carriers, to move the litter or stretcher about. The handles C are connected by hooks D with the transverse cross bars B and B', so as to brace the frame, and render the same strong and durable.

A fabric E is stretched between the side bars A and A', and extends from one cross bar to the other, as plainly indicated in Fig. 2. The fabric is preferably canvas covered by oilcloth, but other suitable material may be substituted. The fabric E is made in two pieces E' and E², separated longitudinally at the middle of the litter, and the adjacent sides are formed with alternately arranged loops E³ and E⁴, through which passes a string F, adapted to be tied at its ends to the cross bars B and B', as plainly shown in Fig. 2. This string or cord F unites the two fabric sections with each other, and when the string is withdrawn from either end, then the two sections can be readily moved from under the patient, one to the right and the other to the left.

The outer sides of the sections E' and E² are formed with welts or sheaths E⁵ and E⁶ respectively, through which loosely pass the side bars A and A', respectively. Portions of the welts E⁵ and E⁶ are cut out so as to form hand holes for the carriers to take hold of the side bars A and A'.

Each of the side bars A and A' is preferably made in sections A² and A³, united with each other by threaded ferrules A⁴ and A⁵, one screwing upon the other as plainly shown in Fig. 3. In the ferrules A⁴ and A⁵ extend longitudinally a short piece of pipe G, embedded in a suitable substance filled into the ends of the side bar sections, the latter being preferably made of bamboo or other suitable material.

Each of the handles C is provided with a threaded head C' screwing on the threaded end G' of a tube G² held in the outer end of each section A² or A³, thus conveniently connecting the handle to the side bars. Each head C' is also provided with a transversely-extending threaded aperture C², adapted to engage the thread G' so that the handle, instead of extending longitudinally in alignment with the side bar, extends at right angles thereto, to form a leg for the frame, and permit of resting the litter on the ground with the fabric E a suitable distance above the ground. In order to change the position of the handle C, to form legs of the same, the carriers take hold of the side bars at the hand-holes while making the change.

In the modified form of handle C³, shown in Fig. 6, the outer end is formed with a fork C⁴ to engage the projecting end of the tube G², to form a leg instead of having the additional threaded aperture C² in the head C'.

It will be seen that by the construction described, the side bar sections and handles may be readily taken apart, so that the entire litter can be packed into a very small bundle.

The cross bars B and B' are provided with heads engaging the tubes $G^2$ at the connection of the sections with the handles, as will be readily understood by reference to Fig. 2. A light awning may be supported on the side bars, and is preferably made of bamboo rods covered by a light fabric, the bamboo rods forming two arches with their ends introduced in apertures at or near the ends of the side bars A and A'.

It will be seen that a litter constructed in this manner permits of conveniently lifting a patient upon the fabric and then the litter is taken hold of by the carriers and taken to the ambulance or train, to be finally carried to the hospital and then placed on the operating table, and if necessary, the frame can then be withdrawn from the canvas by removing the handles C, the cross bars B, B' and then withdrawing the side bars A and A' from the welts $E^5$ and $E^6$ of the fabric E, thus leaving the fabric under the patient. After the operation the frame is replaced by inserting the side bars A A' in the welts $E^5$, $E^6$, then putting the cross bars B B' in place and finally the handles C. The litter with the patient thereon can now be carried to the bed, and the litter is then supported by the carriers taking hold of the side bars at the hand-holes until the handles are removed, and then the litter is placed directly on the mattress and the cord F is withdrawn to disconnect the fabric sections at the middle and to permit of moving the said sections outwardly from under the patient.

By the arrangement described it is not necessary to lift the patient more than once, that is at the time when he is placed on the litter, and consequently much pain will be avoided, also hemorrhages or the complication of a simple fracture.

Having thus described my invention, I claim as new and desire to secure by Letters Patent—

1. In a litter, a frame, the side bars of which are tubular and sectional, threaded tubular ferrules uniting the sections, and the inner concealed tube G extending across the joint thus formed, substantially as described.

2. A litter comprising a frame formed of the sectional side bars, having threaded ends, handles having caps C' on their inner ends provided with longitudinal and transverse threaded openings $C^2$ to connect them longitudinally to the side bars or at right angles thereto, cross bars B B' connecting the ends removably with the ends of the side bars, the brace hooks D and the removable fabric cover having its outer edges removably receiving the side bars, substantially as described.

3. A litter comprising the sectional separable frame, having side and end bars, the longitudinally divided fabric cover E having side pockets along its outer edges and provided at the adjacent edges of its two sections with interlocking loops $E^3$ $E^4$ and a flexible cord F passed through the loops and tied at its ends to the middle portions of the respective cross bars, whereby the middle of the cover will be rendered flexible or yielding to the body laid thereon, substantially as described.

RICARDO ORTEGA.

Witnesses:
S. M. SIMMONS,
JESSE W. SPARKS.